(12) United States Patent
Wimmers et al.

(10) Patent No.: US 11,614,549 B2
(45) Date of Patent: Mar. 28, 2023

(54) STRUCTURED SURFACE PART FOR RADIATION CAPTURING DEVICES, METHOD OF MANUFACTURING SUCH A PART AND X-RAY DETECTOR

(71) Applicant: KONINKLIJKE PHILIPS N.V., Eindhoven (NL)

(72) Inventors: Onno Jan Wimmers, Valkenswaard (NL); Johannes Wilhelmus Maria Jacobs, Boxtel (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/772,449

(22) PCT Filed: Dec. 10, 2018

(86) PCT No.: PCT/EP2018/084073
§ 371 (c)(1),
(2) Date: Jun. 12, 2020

(87) PCT Pub. No.: WO2019/115414
PCT Pub. Date: Jun. 20, 2019

(65) Prior Publication Data
US 2021/0080597 A1    Mar. 18, 2021

(30) Foreign Application Priority Data

Dec. 14, 2017  (EP) ..................................... 17207421

(51) Int. Cl.
*G01T 1/20*    (2006.01)
(52) U.S. Cl.
CPC .......... *G01T 1/2018* (2013.01); *G01T 1/2002* (2013.01)

(58) Field of Classification Search
None
See application file for complete search history.

(56) References Cited

U.S. PATENT DOCUMENTS

| 10,126,432 B2 | 11/2018 | Nagata |
| 10,607,745 B2 | 3/2020 | Nakamura |
(Continued)

FOREIGN PATENT DOCUMENTS

| WO | WO2007046010 A2 | 4/2007 |
| WO | WO2010047494 A2 | 4/2010 |
| WO | WO2015118533 A1 | 8/2015 |

OTHER PUBLICATIONS

PCT International Search Report, International application No. PCT/EP2018/084073 dated Mar. 19, 2019.
(Continued)

*Primary Examiner* — Edwin C Gunberg
(74) *Attorney, Agent, or Firm* — Larry Liberchuk

(57) ABSTRACT

In a conventional radiation capturing device, such as an X-ray device or a CT scanner, a structured surface part, e.g. a scintillator array, is used that is manufactured by mechanical processing, e.g. by dicing and grinding. In order to modifying the scintillating properties of a scintillating material, further manufacturing steps, such as high temperature cycling like sintering etc., are performed in order to restore or at least improve the scintillating properties. This application proposes to form a structured surface part with a particle-in-binder structure containing scintillator or other radiation-relevant particles, using additive manufacturing with a photosensitive mixture to form a layer-wise structure. Therefore, subsequent manufacturing steps, such as sintering, can be omitted. The structured surface part is bendable.

16 Claims, 2 Drawing Sheets

(56) References Cited

U.S. PATENT DOCUMENTS

| | | | |
|---|---|---|---|
| 2005/0208290 A1* | 9/2005 | Patel | G01T 1/06 |
| | | | 428/323 |
| 2007/0138409 A1* | 6/2007 | Daniel | G01T 1/20 |
| | | | 250/483.1 |
| 2009/0039562 A1 | 2/2009 | Freund | |
| 2013/0026371 A1* | 1/2013 | Holloway | G01T 1/16 |
| | | | 252/301.36 |
| 2013/0058452 A1 | 3/2013 | Levene | |

OTHER PUBLICATIONS

Chartier T. et al., "Additive Manufacturing to Produce Complex 3D Ceramic Parts", Journal of Ceramic Science and Technology, vol. 6, No. 2, 2015, pp. 95-104.
Jung I.D. et al., "Flexible Gd2O2S:Tb Scintillators Pixelated with Polyethylene Microstructures for Digital X-Ray Image Sensors", Journal of Micromechanics and Microengineering, vol. 19, 2009.
Jung P. G. et al., "Microdome-Grooved Gd2O2S:TB Scintillator for Flexible and High Resolution Digital Radiography", Optics Express, vol. 18, No. 14, 2010.

* cited by examiner

STRUCTURED SURFACE PART FOR RADIATION CAPTURING DEVICES, METHOD OF MANUFACTURING SUCH A PART AND X-RAY DETECTOR

FIELD OF THE INVENTION

The present invention relates to a structured surface part that can be used in radiation capturing devices in security or medical applications, e.g. in an X-ray device or a CT scanner. The present invention further relates to an associated method of manufacturing such a surface part, and an X-ray detector comprising the discussed surface part.

BACKGROUND OF THE INVENTION

In radiation capturing devices, such as an X-ray device or a CT scanner, there are several applications for structured surface parts. For example, an X-ray device usually has a scintillator that is irradiated by X-rays and converts the X-ray radiation into visible light, which is then converted into electrical charge by photodiodes. However, there are also applications, in which e.g. a collimator is used for modulating a stream of X-rays by only allowing, for example, parallel X-rays to pass through. As a further application, a filter that removes a part of the X-Ray spectrum can be arranged in the beam path. These conventional structured surface parts have in common that they are manufactured by mechanical processing, e.g. by dicing and grinding. For example, in the case of a scintillator, this has the disadvantage that dicing and grinding has to be performed on relatively hard materials, which causes a comparatively slow production and correspondingly high production costs. However, also alternative manufacturing processes, such as casting the scintillating material into molds, have disadvantages, for example, with respect to the accuracy of the achievable surface structure.

US 2007/0138409 A1 discloses a method of forming an X-ray conversion screen. The method uses a mold to mold a scintillating material layer including cavities in the scintillating material layer. By repeated moldings, the phosphor layer is built up. The cavities may be filled with a pixel cell separating material or coated with a reflective material such as a sputtered metal to optically isolate each pixel.

WO 2015/118533 A1 discloses a process for fabricating a three-dimensional scintillator material. On a surface region a pattern of a scintillator formulation is formed, wherein the formulation comprises at least one pre-polymer polymerizable into a polymer and at least one photoinitiator. Polymerization of said at least one pre-polymer forming said pattern is then affected. Then, a further pattern on the polymerized pattern is formed. These steps are repeated to afford a three-dimensional structure.

US 2009/0039562 A1 discloses a method for producing an anti-scatter grid or collimator for a radiation type, which is formed from at least one base body of prescribable geometry having transmission channels or slits for primary radiation of the radiation type which extend between two opposite surfaces of the base body. The base body is formed from a structural material that strongly absorbs the radiation type, either using the injection molding technique or by way of the technique of stereolithography.

SUMMARY OF THE INVENTION

It is, therefore, an object of the present invention to overcome the above-mentioned drawbacks and to provide an improved surface part applicable to radiation capturing devices, which can ideally be manufactured with less effort. The object of the present invention is solved by the subject-matter of the appended independent claims, wherein further embodiments are incorporated in the dependent claims.

According to a first aspect, there is provided a structured surface part applicable to radiation capturing devices, in particular to be irradiated in such a device, e.g. in an X-ray device or a CT scanner.

In this description, a "structured surface part" may be in particular understood as a part with e.g. a grid-like surface, a pixilated surface or the like. It may also have radiation spectrum filtering or radiation shielding properties.

The structured surface part comprises:

An arrangement area defining at least one surface area of the structured surface part.

In this description, an arrangement area may be an imaginary or a physical area, which can be either flat or curved.

A plurality of protrusions arranged on the arrangement area, preferably within the surface area, wherein the protrusions comprise a photosensitive material mixture at least containing particles having radiation-relevant properties, a binder and a cured photosensitive component.

In this description, particles having "radiation-relevant properties" may be in particular understood as particles that can either be excited by radiation and react accordingly, or shield or absorb radiation. In the following, such particles may also be referred to as radiation-relevant particles.

These particles and/or the cured photosensitive component may initially, i.e. before or at start of manufacturing the structured surface part, be dispersed in the binder, wherein a particle-in-binder structure is formed and, ideally, at least largely remained in the present structured surface part.

The protrusions may be arranged in a grid, wherein the protrusion can be connected to each other, or may form an array of e.g. pixels, wherein the protrusions are arranged individually with preferably even distances to each other. The height dimension of the protrusions may vary depending on the application, wherein, for example, in scintillator applications a height of 0.1 to 10 mm, preferably 0.1 to 5 mm, more preferably 0.1 to 2 mm, has proved to be particularly advantageous. In case of e.g. radiation shielding applications, the height dimension may be adapted to the type of radiation, wherein a height of 0.5 to 100 mm is advantageous.

Further, in a direction pointing away, e.g. oriented at an angle, from or perpendicular to the surface area, the protrusions can also consist of several layers one above the other. All or at least most of these layers may contain at least portions of the cured photosensitive component.

Ideally, the individual layers are congruent, but individual layers may be slightly smaller or larger in area than others.

The structured surface part is bendable and/or flexible. For example, this may be achieved by adding a non-polymerizable material to the polymerizable material. These combination of materials may be dispersed in the binder, or a combination of these materials may form the binder. Alternatively or additionally, the arrangement area may have material properties that allow the structured surface part to be bendable and/or flexible. Bending may be done selectively, i.e. it may be bent back and forth with different bending angles, and may be repeated many times to adapt the structured surface part to various imaging tasks. Accordingly, under bendability or flexibility, it may be understood that the shape of the structured surface part may be changed several times, depending on a respective imaging task.

An advantageous effect of this surface part is that an additive manufacturing process, such as 3D-printing, e.g. stereo lithography, can be used that allows immediate use of the structured surface part in a radiation capturing device for security or medical applications. In particular, since the particles may be present in the particle-in-binder structure and by using the photosensitive component to form the layer-wise arrangement of the protrusions, no further heat treatment or high temperature cycling, as e.g. sintering, are required, as was necessary in the previous mechanical manufacturing processes to remove binding material after the application of the radiation-relevant particles and/or to restore or improve the starting properties of these particles. Therefore, the radiation-relevant properties of the particles in the particle-in-binder structure do not change during the formation of the structure, which would be the case if a subsequent heat treatment would be applied. Thus, at least one of the above-mentioned drawbacks may be overcome. Furthermore, the properties of the starting material mixture can be tailored and customized for each specific irradiating application prior to the surface part manufacturing process itself. Furthermore, in case of individually arranged protrusions as well as in contrast to previous casting processes, gaps between individual protrusions can be made particularly small. This is particularly advantageous when using the structured surface part as a scintillator, since such thus has a particularly high efficiency. Thus, for example, comparatively small gaps of 0.04 to 0.4 mm between the individual protrusions can be achieved.

In an embodiment, the photosensitive component is selected or combined from: acrylate monomers, oligomers and modified acrylates.

These starting materials are particularly suitable for photo polymerization, which refers also to stereo lithography. This component may be dispersed in the starting material mixture or in parts thereof and is due to its curing properties suitable to be easily cured by light of e.g. a UV laser beam as a light source controlled by a microprocessor or a other computing unit.

Optionally, the binder is an organic binder and may in particular be selected or combined from: acrylates, epoxies, polyurethanes and silicones.

At least some of the components of the material mixture may initially be in powder form, which then can be dispersed in or mixed with the binder, thereby creating e.g. an organic-inorganic system in form of a paste, suspension or the like that can be photo polymerized. In particular, the radiation-relevant particles may initially be dispersed in the binder and, further, may also in use of the structured surface part be remained in the particle-in-binder structure.

In an embodiment, the binder material and the photosensitive component material can be the same.

This simplifies the preparation and provision of the starting material mixture. In this case, the binder material may have photo polymerizing properties and may still be adapted to build a particle-in-binder structure with the radiation-relevant particles. Optionally, the photosensitive material mixture, in an initial state, contains at least one scintillating material, preferably in form of powder, dispersed in or mixed with the binder and/or the above, preferably organic, binder material.

The starting scintillating material may already have been annealed, sintered or treated under suitable conditions. Due to the dispersion of the material the protrusions also have the scintillating properties caused by the dispersed scintillating material. In this case, the structured surface part can be applied to an X-ray device as a structured scintillator, which generates light when irradiated with radiation. Further, the properties of the starting scintillator material can be tailored and customized for each specific imaging application prior to the structured surface element manufacturing process. This is advantageous to provide e.g. large area scintillators with a high modulation transfer function (MTF) and particularly low afterglow effects, thereby providing fast scintillators.

For example, good results has been achieved with e.g. $GdO_2S_2$:Pr etc.

In other applications where high light output is desired, $GdO_2S_2$:Tb can be used.

In an embodiment, a first layer of the respective protrusion may contain a first scintillating material, whereas a second layer of the same protrusion may contain a second scintillating material that has a different composition and thus different properties to the first material.

As a possible result, the first and the second layer having different scintillating properties may generate first radiation and second radiation, also with different properties. Thus, a distinction can be made, whether a radiation has been generated in the respective upper or lower part of the scintillator.

Optionally, the structured surface part is a scintillator array, wherein the protrusions are individual pixels each having scintillating properties.

The individually arranged pixels may be spaced at equal intervals, preferably within the same surface area as, in particular, defined by the arrangement area.

This provides a pixilated scintillator array with particular small gaps between the individual pixels, which affects a high efficiency as well as a high light sensitivity. Due to the pixilated structure, e.g. spatial resolution of the scintillator or the X-Ray device can be improved.

Further, optionally, a substrate defines physically the arrangement area as well as the at least one surface area of the structured surface part.

The substrate, for example, may be a homogeneous material, plastic (e.g. carbon, polyimide), e.g. provided as a foil or sheet, metal (e.g. aluminum), e.g. provided as a foil or sheet, or paper. The substrate may have mechanical properties that enable the structured part to be flexible and/or bendable.

In an embodiment, the single protrusions are at least partially, ideally complete covered by a reflector.

The reflector has properties that allow at least the partial reflection of radiation. Thus, by applying the reflector, e.g. the radiation absorption of the structured surface part may be improved. Furthermore, the relative light output of such a structured that is used as a scintillator may be improved compared to protrusions that do not have a reflector or are left blank. Also, the MTF may be optimized compared to blank protrusions.

Optionally, the reflector comprises at least one top reflector layer, arranged on at least an outermost layer or as a plurality of outer layers of the respective pixel and facing away from the substrate or its surface area.

The top reflector layer prevents leakage of the radiation in the direction of the top layer. Advantageously, this causes any generated light that protrudes away from a photosensitive array to which the scintillator may be attached to be reflected back towards the photosensitive array. The application of the top reflector layer may be performed after the application of the several layers on the substrate and therefore forms the uppermost layer. It, however, differs in its reflecting properties from the photosensitive material mixture of the other layers of the protrusions.

In an embodiment, the reflector may comprise at least one between-pixels reflector layer, arranged in a gap between two individual pixels.

The between-pixels reflector can further increase efficiency by also directing the radiation between the pixels in the preferred direction and causes the bundling of light towards the pixels. This may result in an even more improved light output as well as an optimized MTF.

In other words, the reflector may be, preferably in addition to the one on the top of the pixels, arranged between the individual protrusions or pixels. Thus, the light output of the surface part can be further improved.

Optionally, the reflector may be provided as reflective particles in preferably an organic binder.

These reflective particles may be selected or combined from: $TiO_2$, $ZrO_2$, $Al_2O_3$ etc. that a dispersed, mixed or solved in an organic binder material, such as an epoxy or silicone resin. Thus, the properties of the reflector can be tailored and customized for each specific imaging application. Further, the reflector may be applied by the same method of manufacturing as the protrusions or pixels.

Alternatively, the reflector member may be a reflective thin film or reflective sheet. By using a reflective sheet, a light-absorbing layer can be applied for further optimizing MTF. For example, a suitable reflective sheet is available as so-called Vicuity tape provided by 3M.

For practical use of the structured surface part, the reflector may, as explained above, be applied on the top of the pixels. Then the above explained substrate, on which the pixels are applied, on the opposing side of the top reflector, is removed. This can be made by e.g. grinding).

Alternatively, the above mentioned substrate may be chosen to have reflective properties, e.g. by using white paper or aluminum. Thus, the substrate itself can form the reflector, in particular in a continuous manner, thereby forming the top side of the protrusions or scintillator pixels. In more detail, the protrusions or scintillator pixels may be directly formed, in particular 3D-printed, on top of the paper or aluminum substrate, wherein the substrate at the same time forms the reflector.

Optionally, the reflector has an elastic modulus less than 10 000 $N/mm^2$ or 10 GPa, preferably less than 3 000 $N/mm^2$ or 3 GPa.

This advantageously causes the structured surface part to be more flexible or bendable within mechanical limits. Thus, the structured surface part can be used as a flexible scintillator for applications in e.g. medical, such as dental etc., or security X-ray devices.

As an alternative to using the structured surface part as a scintillator, the photosensitive material mixture may contain a radiation shielding material dispersed or mixed in the material mixture, i.e. in the photosensitive component and/or binder, wherein the radiation shielding material is adapted to shield e.g. X-rays or gamma rays.

Thus, the structured surface part can also be used in radiation shielding applications, wherein the protrusions have radiation shielding properties and may be connected to each other instead of the above-mentioned spaced arrangement. For example, such a structured surface part can be used in e.g. X-ray shielding applications, such as a collimator or grids. The radiation shielding material may be applied as metal particles, such as Mo, Pb, Ta or W.

According to a second aspect, an X-ray detector is provided, that comprises the structured surface part in one or more of the embodiments explained above. The X-ray detector comprises:

A structured surface part, e.g. a pixilated scintillator array, having a plurality of pixels individually arranged on a substrate.

The substrate may, for example, be a homogeneous material, such as plastic (e.g. carbon, polyimide), metal (e.g. aluminum) or paper. Alternatively, the above-explained top reflector may concurrently form the substrate. The substrate may have material properties that allow a flexible and/or bendable structured surface part.

An optical detector arranged in optical communication with the structured surface part. The optical detector may have structural and/or material properties that allow to be flexible and/or bendable so that a shape of the optical detector may be adapted to the structured surface part and to various imaging tasks.

Further, in a direction pointing away from or perpendicular to a surface area of the substrate, the single pixels consist of several layers one above the other.

Furthermore, the single pixels comprise a photosensitive material mixture at least containing scintillating material, a binder and a cured photosensitive component.

Since the scintillating material, which is preferably present in particles, ideally has a particle-in-binder structure, the X-ray device can be manufactured with little effort. In particular, in contrast to previous manufacturing methods, the binder has not to be removed. More precisely, heat treatment, as e.g. sintering, can be omitted in the end of the manufacturing process of the scintillator. Thus, the scintillating properties of the scintillating material are not changed due heat treatment and, therefore, the scintillating properties of the starting scintillator particles are kept. This results in an improved X-ray absorption, relative light output and MTF.

According to a third aspect of the present invention, a method of manufacturing a structured surface part is presented. The method comprises the following steps:

Providing a substrate defining a surface area. The substrate may be bendable and/or flexible.

Providing a photosensitive material mixture at least containing particles having radiation-relevant properties, a binder and a cured photosensitive component.

Layer-by-layer-wise application of the photosensitive material mixture to the surface area in such a way that the protrusions consisted of several layers one above another are formed.

Further, between the applications of the respective layer, by means of a light source, the photosensitive material is cured.

Furthermore, the binder and/or the photosensitive component are remained in the protrusions to be still present in use of the structured surface part.

Since the scintillating material, which is preferably present in particles, ideally has a particle-in-binder structure, the binder has not to be removed by e.g. heat treatment, as sintering, after forming the protrusions. As a result, the radiation-relevant properties are not changed due to heat treatment, whereby a better performance of the structured surface part can be achieved.

In an embodiment, the layer-by-layer-wise application of the photosensitive material mixture may be done on the substrate, which is chosen to be reflective, such as white paper or aluminum. Thus the substrate itself may form a continuous reflector on top the protrusions. This provides a particularly efficient pixilated scintillator having pixels (i.e. the protrusions) with a reflector disposed thereon.

Alternatively, the reflector may be applied on top of the layer-wise formed protrusions (i.e. the scintillator pixels) and the substrate on which the pixels were formed is removed, e.g. by grinding.

It shall be understood that a preferred embodiment of the present invention can also be any combination of the dependent claims with the respective independent claim. These and other aspects of the present invention will become apparent from and be elucidated with reference to the embodiments described hereinafter.

BRIEF DESCRIPTION OF THE DRAWINGS

Exemplary embodiments of the invention will be described in the following drawings. In the following drawings.

DETAILED DESCRIPTION OF EMBODIMENTS

Figure 1:
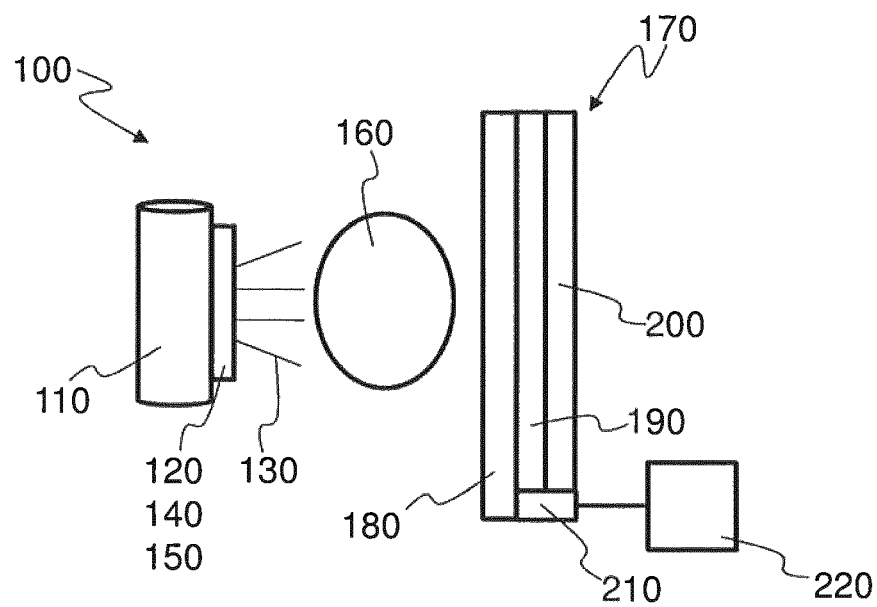
FIG. 1 shows schematically and exemplary an embodiment of an X-ray detector according to a second aspect, including structured surface parts according to a first aspect.

FIG. 1 shows schematically and exemplarily an embodiment of an X-ray detector 100 as an example of a radiation capturing device or an object imaging device. The X-ray detector 100 comprises an X-ray radiation source 110 capable for generating X-ray radiation, a collimator 120, which is arranged adjacent to the radiation source 110 and adapted to narrow the spatial extend of a radiation beam 130, in particular an X-ray beam, generated by the radiation source 110. For this purpose, the collimator 120 includes a first structured surface part 140, which will be described in more detail below. In this embodiment, a second structured surface part 150 in form of a filter capable for modifying the X-ray spectrum emitted by the radiation beam 130 is arranged in the beam path. This second structured surface part 150 will be also described in more detail below.

The radiation beam 130 is here focused on an object 160 to be examined, which object 160 is, when the radiation source 110 is activated, traversed by the radiation beam 130.

On the side opposite to the radiation source 110 of the object 160, a detection device 170 of the X-ray detector 100 is arranged. This includes a third structured surface part 180, in particular an anti scatter grid, which is arranged in the beam path of the radiation beam 130 to reduce its scattered radiation for downstream components and which will be explained in more detail below.

The detection device 170 of this embodiment further includes a fourth structured surface part 190 which is, in the direction of the beam path, arranged downstream to the third structured surface part 180. The function of the fourth structured surface part 190 is different from that of the above-mentioned structured surface parts 140, 150 and 180 since the fourth structured surface part 190 is a scintillator capable of converting the incident X-ray radiation beam 130 into visible light. The fourth structured surface part 190 will also be described in more detail below.

The detection device 170 further includes an optical detector 200 in the form of a photodiode array, which is arranged in optical communication with the fourth structured surface part 190, i.e. the scintillator, and capable of converting the visible light of the second structured surface part 190 into electric charge. An electronic converter 210, e.g. an A/D-converter, is adapted to convert the electric charge so that a corresponding image of the object 160 is displayed on a monitor 220.

In the following, the four structured surface parts 140, 150, 180 and 190 are described in more detail. Accordingly, these have in common that they each have an (in some embodiments, only imaginary) arrangement area 141, 151, 181, 191 that defines a two-dimensional surface area of the respective structured surface part 140, 150, 180 and 190. On the respective surface area or within the respective arrangement area 141, 151, 181, 191, a respective plurality of protrusions 142, 152, 182, 192 is arranged, wherein their arrangement and orientation depend on to which of the above-described applications within the X-ray detector 100 the respective surface part 140, 150, 180, 190 is provided. Further, the structured surface parts 140, 150, 180 and 190 have in common that their protrusions 142, 152, 182, 192 are each formed layer-wise from a photosensitive material mixture that at least contains specific particles with radiation-relevant properties adapted to be suitable for the respective purpose. The specific particles are combined with a binder and a cured photosensitive component, wherein the binder is an organic binder, such as acrylates, epoxies, polyurethanes or silicones. The photosensitive component is made from e.g. acrylate monomers, oligomers and modified acrylates, and cured by photo polymerization, as it will be exemplary described in more detail below. It is noted that the specific particles of are present in a particle-in-binder structure.

Further, it is noted that in order to avoid repetition, only two exemplary embodiments of the four structured surface parts 140, 150, 180, 190 are described below, namely the third structured surface part 180, i.e. the anti-scatter grid, in which the particles have radiation shielding properties, and the fourth structured surface part 190, i.e. the scintillator, in which the particles are adapted to have scintillating properties.

Figure 2A:
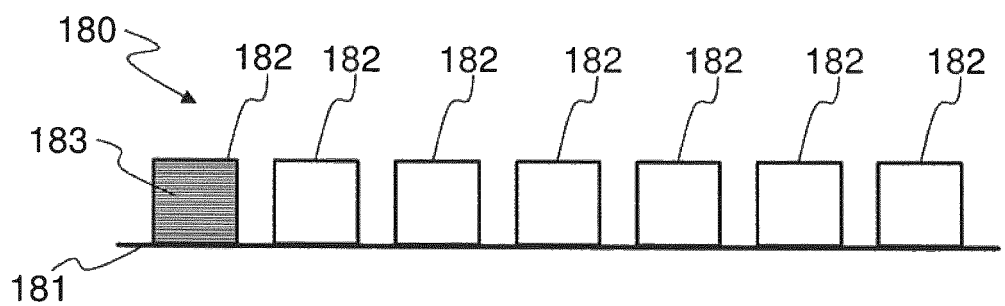
FIG. 2A shows schematically and exemplary a side view of an embodiment of a third structured surface part according to a first aspect.

Accordingly and with reference to FIG. 2A, the third structured surface part 180, i.e. the anti-scatter grid, of the detection device 170 will now be exemplary described in more detail. In this embodiment, the arrangement area 181 of the third structured surface part 180 is a physical substrate with a two-dimensional surface that defines the surface area of the first structured surface part 140. On the surface of the substrate or within the surface area, the plurality of protrusions 182 is arranged grid-like and oriented along an angle (not shown) at which the X-ray radiation of the radiation beam 130 should reach the fourth structured surface part 190, i.e. the scintillator, which is arranged downstream thereto. The protrusions 182 are formed from the above-mentioned photosensitive material mixture that at least contains metal particles with radiation-relevant properties adapted to be suitable for the purpose of the anti-scatter grid, namely adapted for sectional shielding the X-ray radiation of the radiation beam 130. In this embodiment, Pb-particles are used due to the radiation shielding purpose, wherein other metal particles having radiation shielding properties, such as Mo, Ta or W, are also suitable. The metal particles are combined with the above-mentioned binder and the cured photosensitive component, wherein the binder is an organic binder, such as acrylates, epoxies, polyurethanes or silicones. The photosensitive component is made from e.g. acrylate monomers, oligomers and modified acrylates, and cured by photo polymerization, as it will be described in more detail below. As already mentioned above, in the third structured surface part 180, the metal particles, i.e. here the Pb-particles are present in a particle-in-binder structure. As indicated schematically in the very left protrusion 182 in FIG. 2A, the protrusions 182 each consist of a plurality of layers 183 arranged one above the other. Due to shielding properties of the protrusions 182, only radiation portions of the radiation beam 130 may pass through the third structured surface part 180 which are in a proper alignment to the protrusions 182.

Figure 2B:
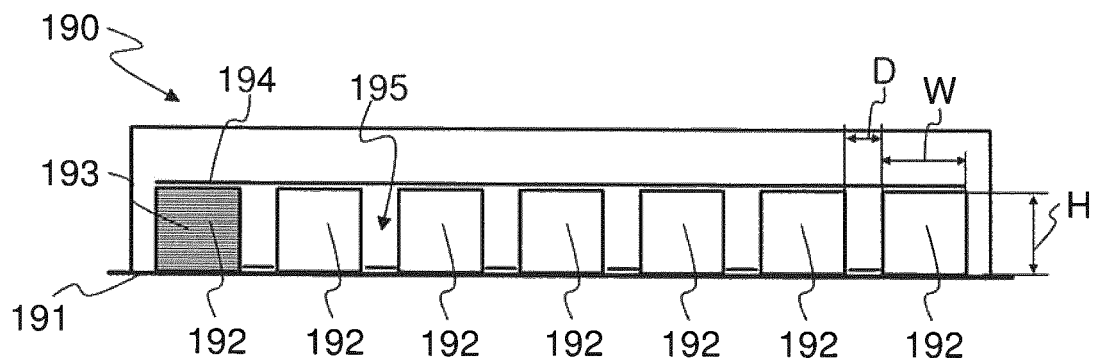
FIG. 2B shows schematically and exemplary a side view of an embodiment of a fourth structured surface part according to a first aspect.

With reference to FIG. 2B, the fourth structured surface part 190 of the detection device 170 will now be exemplary described in more detail. Instead of providing radiation shielding, the fourth structured surface part 190 works as a scintillator. Accordingly, the arrangement area 191 of the fourth structured surface part 190 is a homogenous substrate, such as plastic, e.g. carbon, polyimide, with a two-dimensional surface that defines a surface area. As described in more detail below, the substrate can, in some embodiments, be removed. On the surface of the substrate, the plurality of protrusions 192 is arranged in an array, each of which protrusions 192 is formed from the above-mentioned photosensitive material mixture that contains at least particles with radiation-relevant properties adapted to be suitable for the purpose of the scintillator, namely having scintillating properties. In this embodiment, GdOS:Pr or $GdO_2S_2$:Pr e particles are used, wherein $GdO_2S_2$:Tb etc. is also suitable for this purpose, depending on the exact application of the X-ray device 100. Due to use as a scintillator, the protrusions 192 of the fourth structured surface part 190 may be referred to as pixels forming a pixilated scintillator array.

The scintillating particles are combined with the above-mentioned binder and the cured photosensitive component, wherein the binder is an organic binder, such as acrylates, epoxies, polyurethanes or silicones. The photosensitive component is made from e.g. acrylate monomers, oligomers and modified acrylates, and cured by photo polymerization, as it will be described in more detail below. It is noted that the scintillating particles form a particle-in-binder structure, which is why the binder as well as the cured photosensitive component are actually present in the protrusions 192. As indicated schematically in the very left protrusion 192 in FIG. 2B, the protrusions 192 each consists of a plurality of layers 193 arranged one above the other.

Further, as it can be seen in FIG. 2B, the pixels or protrusions 192 are arranged with gaps in between. Typically, the distance D or gaps between the individual pixels or protrusions 192 are 0.04 mm to 0.4 mm. The height H of the protrusions 192 is preferably between 0.1 mm and 10 mm, more preferably between 0.1 mm and 1 mm. The width W and/or length L is between 0.4 mm and 4 mm.

It is noted that the comparatively small gaps between the pixels or protrusions 192 are possible due to the above-mentioned combination of the (scintillating) particles-in-binder structure and the manufacturing method of photo polymerization of the photosensitive component.

Furthermore, the protrusions 192 are covered by a continuous top reflector 194 arranged on the top layer of the layers 193 of each protrusion 192. Also, a between-pixels reflector 195 is arranged between the individually arranged pixels or protrusions 192. In this regard it is noted that the reflectors 194, 195 in FIG. 2B are only spaced from the respective surface of the pixels or protrusions 192 for better illustration. In fact, the respective reflector 194, 195 is in direct contact with the respective outer surface.

Both, the top reflector 194 and the between-pixels reflector 195, in this embodiment are formed as layers that cover the respective protrusion 192 or its outermost layer. They are exemplarily provided as reflective particles, such as $TiO_2$ or $ZrO_2$ or $Al_2O_3$, in an organic binder. Here, the reflectors 194, 195 are provided with an elastic modulus less than 10 000 N/mm$^2$, preferably less than 3 000 N/mm$^2$, resulting in a flexible fourth structured surface part 190 capable for e.g. dental X-ray detectors.

Other, not illustrated embodiments have a top reflector that is provided as reflective thin film or reflective sheet. Further embodiments have a substrate that is formed from a reflective material, such as aluminum or (white) paper, which at the same time functions as top reflector, in particular as the top reflector 194.

Figure 3:
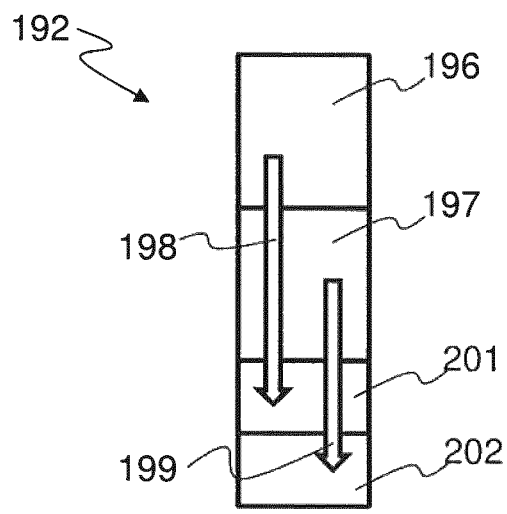
FIG. 3 shows schematically and exemplary a portion of a further embodiment of a structured surface part according to a first aspect.

FIG. 3 shows a portion of a further embodiment of a pixel or protrusion 192 of the fourth structured surface part 190, i.e. the scintillator, that includes at least a first layer 196 and a second layer 197 having different compositions of scintillating material, namely a respective first and a respective second scintillating material dispersed in the photosensitive material mixture. However, both layers 196, 197 have in common that they also have the particle-in-binder structure described above.

The different layers 196, 197 are adapted to, when irradiated with x-rays, generate first radiation 198 and second radiation 199 having different wavelengths. The optical detector 200, respectively, comprises a first detection unit 201 for generating first detection values depending on the first radiation 196 and a second detection unit 202 for generating second detection values depending on the second radiation 199, wherein, in this embodiment exemplarily, the first detection unit 201 and the second detection unit 202 are arranged one above another, and wherein the upper one is sensitive to a first wavelength range of the first radiation 198 and transparent to a second wavelength range of the second radiation 199 and wherein the lower one is sensitive to the second wavelength range.

For the sake of completeness, it is noted that the protrusions 142, 152 of the first and second structured surface parts also comprise several layers 143, 153, since the basic principle of these structured surface parts 140, 150 is identical to that of the structured surface parts 180, 190.

Figure 4:
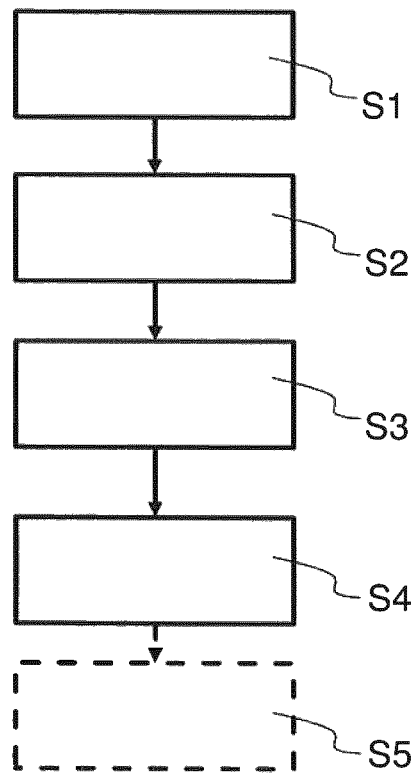
FIG. 4 shows a flowchart exemplarily illustrating an embodiment of a manufacturing method according to a third aspect for manufacturing a structured surface part according to the first aspect.

With reference to FIG. 4, which shows a flow chart, an embodiment of a manufacturing method for manufacturing the fourth structured surface part 190 will exemplarily be described in the following. Of course, this method may be also, at least substantially, applied for manufacturing the first, second and third structured surface parts 140, 150 and 180.

In Step S1, the homogenous substrate, which represents the arrangement area 191 and e.g. made from plastic, e.g. carbon, polyimide, is provided. The substrate has a two-dimensional surface that defines a surface area.

In Step S2, the photosensitive material mixture is provided, which at least contains particles having scintillating properties, a binder and a cured photosensitive component.

In Step S3, a layer-wise application of the photosensitive material mixture to the surface area is performed in such a way that the pixels or protrusions 192 consisted of several layers one above another are formed and arranged individually. When applying the single layers, the photosensitive component are cured in each case between layer-application, wherein a light source, such as a UV-laser beam (not shown) is used.

In Step S4, the binder and/or the photosensitive component are remained in the protrusions 192 to be still present in use of the structured surface part 190. As a result, the particles having scintillating properties are present in a particle-in-binder structure that does not require subsequent heat treatment, such as sintering. Therefore, a whole manufacture process step can be omitted, and the scintillating properties of the particles do not change adversely.

However, for some of the other structured surface parts, an optional further Step S5 (not shown) of removing the substrate by e.g. grinding is performed.

It should to be noted that embodiments of the invention are described with reference to different subject-matters. In particular, some embodiments are described with reference to method-type claims, whereas other embodiments are described with reference to device-type claims. However, a person skilled in the art will gather from the above, and the following description that, unless otherwise notified, in addition to any combination of features belonging to one type of subject-matter, also other combinations between features relating to different subject-matters is considered to be disclosed with this application.

All features can be combined to provide a synergetic effect that is more than the simple summation of the features.

While the invention has been illustrated and described in detail in the drawings and foregoing description, such illustration and description are to be considered illustrative or exemplary, and not restrictive. The invention is not limited to the disclosed embodiments.

Other variations to the disclosed embodiments can be understood, and effected by those skilled in the art in practicing the claimed invention, from a study of the drawings, the disclosure, and the dependent claims.

In the claims, the word "comprising" does not exclude other elements or steps, and the indefinite article "a" or "an" does not exclude a plurality. A single unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SIGNS

100 X-ray detector
110 X-ray radiation source
120 Collimator
130 Radiation beam
140 First structured surface part (e.g. collimator)
141 Arrangement area (e.g. substrate)
142 Plurality of protrusions
143 Plurality of layers
150 Second structured surface part (e.g. filter)
151 Arrangement area (e.g. substrate)
152 Plurality of protrusions
153 Plurality of layers
160 Object
170 Detection device
180 Third structured surface part (e.g. anti-scatter grid)
181 Arrangement area (e.g. substrate)
182 Plurality of protrusions
183 Plurality of layers
190 Fourth structured surface part (e.g. scintillator array)
191 Arrangement area (e.g. substrate)
192 Protrusions/pixels
193 Plurality of layers
194 Top reflector
195 Between-pixels reflector
196 First layer
197 Second layer
198 First radiation
199 Second radiation
200 Optical detector
201 First detection unit
202 Second detection unit
210 Electronic converter
220 Monitor
D Distance
H Height
W Width
S1 Method step 1
S2 Method step 2
S3 Method step 3
S4 Method step 4
S5 Method step 5

The invention claimed is:

1. A structured surface part to be irradiated for a radiation capturing device, comprising:
   an arrangement area defining a surface area of the structured surface part;
   a plurality of protrusions arranged in the arrangement area, wherein the protrusions comprise a photosensitive material mixture at least containing:
      particles having radiation-relevant properties,
      a binder, and
      a cured photosensitive component different from the binder,
   wherein, in a direction pointing away from or perpendicular to the surface area, the photosensitive material mixture of the protrusions comprises a number of layers one above the other, and wherein the structured surface part is bendable.

2. The structured surface part according to claim 1, wherein bendability of the structured surface part is defined by a combination of a non-polymerizable material and the photosensitive component.

3. The structured surface part according to claim 1, wherein the particles having radiation-relevant properties comprise at least one scintillating material dispersed in or mixed with at least one of the photosensitive component and the binder.

4. The structured surface part according to claim 3, wherein a first layer of a protrusion contains a first scintillating material and a second layer of the protrusion contains a second scintillating material.

5. The structured surface part according to claim 1, wherein a substrate defines at least one of the arrangement area and the surface area of the structured surface part.

6. The structured surface part according to claim 1, wherein the structured surface part is a scintillator array, wherein the protrusions are individual pixels each having scintillating properties, and wherein the pixels are at least partially covered by a reflector.

7. The structured surface part according to claim 6, wherein the reflector comprises at least one top reflector layer, arranged on at least an outermost layer of the respective pixel and facing away from the substrate.

8. The structured surface part according to claim 6, wherein the reflector comprises at least one between-pixels reflector layer, arranged in a gap between two individual pixels.

9. The structured surface part according to claim 6, wherein the reflector contains reflective particles in an organic binder.

10. The structured surface part according to claim 6, wherein the reflector is a reflective thin film or reflective sheet.

11. The structured surface part according to claim 6, wherein the reflector is formed by the substrate that is made from a material having reflecting properties.

12. The structured surface part according to claim 6, wherein the reflector is bendable.

13. The structured surface part according to claim 1, wherein the particles containing radiation-relevant properties contain particles that partly or completely absorb X-rays or gamma rays or at least a part of their respective spectrum.

14. An X-Ray detector, comprising:
a structured surface part to be irradiated for a radiation capturing device, comprising:
an arrangement area defining a surface area of the structured surface part;
a plurality of protrusions arranged in the arrangement area, wherein the protrusions comprise a photosensitive material mixture at least containing:
particles having radiation-relevant properties,
a binder, and
a cured photosensitive component different from the binder,
wherein, in a direction pointing away from or perpendicular to the surface area, the photosensitive material mixture of the protrusions comprises a number of layers one above the other, and wherein the structured surface part is bendable; and an optical detector arranged in optical communication with the structured surface part.

15. A method of manufacturing a structured surface part to be irradiated for a radiation capturing device, comprising:
providing a substrate defining a surface area;
providing a photosensitive material mixture at least containing:
particles having radiation-relevant properties,
a binder,
a curable photosensitive component different from the binder; and
layer-wise applying the photosensitive material mixture to the surface area in such a way that protrusions comprising a number of layers one above another are formed,
wherein between the application of the respective layer, by a light source, the photosensitive component is cured,
wherein at least one of the binder and the photosensitive component are remained in the protrusions to be present in use of the structured surface part, and
wherein the structured surface part is provided to be bendable.

16. The method of claim 15, further comprising adjusting bendability of the structured surface part by combining a non-polymerizable material and the photosensitive component.

* * * * *